United States Patent
Ellis et al.

(10) Patent No.: US 7,118,718 B2
(45) Date of Patent: Oct. 10, 2006

(54) GYPSUM DECONTAMINATION PROCESS

(75) Inventors: William J. Ellis, Lake City, FL (US); Clark Bailey, Germantown, TN (US)

(73) Assignee: PCS Nitrogen, Inc., Northbrook, IL (US)

( * ) Notice: Subject to any disclaimer, the term of this patent is extended or adjusted under 35 U.S.C. 154(b) by 440 days.

(21) Appl. No.: 10/240,733

(22) PCT Filed: Oct. 5, 2001

(86) PCT No.: PCT/US01/27755

§ 371 (c)(1),
(2), (4) Date: Apr. 21, 2003

(87) PCT Pub. No.: WO02/060817

PCT Pub. Date: Aug. 8, 2002

(65) Prior Publication Data

US 2003/0163014 A1     Aug. 28, 2003

(30) Foreign Application Priority Data

Oct. 5, 2000    (US) ................................. 09/679900

(51) Int. Cl.
    *B01D 11/02*    (2006.01)
    *C22B 60/00*    (2006.01)
(52) U.S. Cl. ...................... 423/2; 423/20; 423/170; 423/555
(58) Field of Classification Search .................... 423/2, 423/20, 170, 555, 1, 166
See application file for complete search history.

(56) References Cited

U.S. PATENT DOCUMENTS

| | | | |
|---|---|---|---|
| 3,949,047 A * | 4/1976 | Cherdron et al. ............... 423/2 |
| 4,113,835 A | 9/1978 | Kurandt et al. | |
| 4,146,568 A | 3/1979 | Lange, Jr. | |
| 4,246,019 A | 1/1981 | Sokolov et al. | |
| 4,362,705 A | 12/1982 | Weterings | |
| 4,387,077 A * | 6/1983 | Weterings et al. ......... 423/21.1 |

(Continued)

FOREIGN PATENT DOCUMENTS

JP    52-41238    10/1977

OTHER PUBLICATIONS

Perry et al.: "Liquid-solid operations and equipment" Perry's Chemical Engineers' Handbook, 7th Edition, section 18, pp. 18-1:18-5, 18-11, & 18-13:18-17 1997.

(Continued)

*Primary Examiner*—Stanley S. Silverman
*Assistant Examiner*—Timothy C. Vanoy
(74) *Attorney, Agent, or Firm*—Oblon, Spivak, McClelland, Maier & Neustadt, P.C.

(57) ABSTRACT

A process for reducing a level of radionuclei in a phosphogypsum material having a radioactive contaminant is provided, wherein the process includes the steps of: (a) mixing the phosphogypsum material with an acid decontamination solution to form a mixture; (b) separating the mixture into a liquid stream having a large portion of the radioactive contamination and a solid stream having a residual component of the acid decontamination solution; and (c) removing the residual component of the acid decontamination solution from the solid stream, thus providing a gypsum material that meets or exceeds federal standards for level of radioactive nuclei and providing a process that is environmentally friendly and capable of avoiding the generation of phosphogypsum stacks, as well as eliminating existing or abandoned phosphogypsum stacks, further providing for recovery of the radioactive nuclei if desired.

30 Claims, 4 Drawing Sheets

U.S. PATENT DOCUMENTS 4,388,292 A * 6/1983 Palmer et al. ............... 123/555
4,399,110 A    8/1983 Kurandt
4,421,731 A * 12/1983 Palmer et al. ............... 423/555
4,431,580 A    2/1984 Schneider et al.
5,045,240 A    9/1991 Skriba et al.

OTHER PUBLICATIONS

Perry, et al., Section 18, "Liquid Solid Operations and Equipment," 'Perry's Chemical Engineer's Handbook', Seventh Edition, McGraw-Hill, pp. 18-1:18-5, 18-11, 18-13:18-17, 1997.

* cited by examiner

GYPSUM DECONTAMINATION PROCESS

CONTINUING APPLICATION DATA

This application is a U.S. National Stage application of PCT Application No. PCT/US01/27755, filed Oct. 5, 2001, which was an International PCT application claiming priority to U.S. application Ser. No. 09/679,900, filed Oct. 5, 2000.

BACKGROUND OF THE INVENTION

1. Field of the Invention

The present invention relates to processes of removing radioactive nuclei or naturally occurring radioactive material (NORM) and, more particularly, to a process which removes radium, such as radium-226, from phosphogypsum material generated during the production of phosphoric acid and which reclaims and decontaminates gypsum.

2. Discussion of the Background

Currently, in the phosphoric acid production industry in which phosphate-ore is processed by the wet-acid process to produce phosphoric acid, the phosphogypsum slurry, often called "gyp" slurry, is pumped to large separation/settling areas where phosphogypsum solids are separated from the liquids. The liquids are then either reused or neutralized and discharged in accordance with state and federal regulations governing plant discharges. The solids remain on-site and are stored in large mound-like hills (note that within the context of the present invention, the combination of the separation/settling area and mound-like hills are referred to as "stacks"), mainly because the level of radium-226 exceeds the regulatory limits of 10 picocuries per gram (10 pCi/g) established under the National Emission Standard for Hazardous Air Pollutants, or NESHAP, 40 CFR § 60.204–60.206. Alternatively, in facilities that are situated on or very near the phosphate ore mines, the solids can be mixed with overburden and put back into the mines to reclaim the mines. These solids must be monitored while on-site and any future use of these solids is severely limited by their radium content.

In view of the foregoing, there is a continuing need for a cost-effective and environmentally friendly process which separates and recovers radium-226 from the phosphogypsum solids yielding non-regulated phosphogypsum.

Furthermore, in decontaminating or other operations in which nitric acid is used to decontaminate, treat or otherwise process material containing phosphogypsum, there is a continuing need for a process, which includes a step to neutralize or otherwise remove residual nitric acid and/or nitrates in non-regulated phosphogypsum for use in construction materials or other applications.

SUMMARY OF THE INVENTION

Accordingly, one object of the present invention is to provide a process for reducing the level of radionuclei in a phosphogypsum material having a radioactive contaminant, said phosphogypsum material being produced in phosphoric acid production from wet acid processing of phosphate-containing ores.

It is a further object of the present invention to provide a process for reducing the level of radionuclei in a phosphogypsum material whereby the mixing step includes violently agitating the mixture for a specified duration at a near-shearing level, wherein shearing or destruction of the solids in the phosphogypsum material does not take place.

Another object of the present invention is to provide a process for reducing the level of radionuclei in a phosphogypsum material wherein the mixing step comprises violently agitating the mixture at an ambient temperature in the range of 70 degrees Fahrenheit to 100 degrees Fahrenheit for a duration.

A further object of the present invention is to provide a process for reducing radionuclei in a phosphogypsum material, containing a step that removes or neutralizes residual acid in the resulting product phosphogypsum.

A still further object of the present invention is to provide a process for reducing the level of radionuclei in a phosphogypsum material wherein the process further contemplates the step of, prior to the mixing of the phosphogypsum and the decontamination solution, washing the phosphogypsum material with water—preferably active pond water—to form a washed mixture. Thereafter, the process includes separating the washed mixture into a liquid stream and a washed solid stream wherein the washed solid stream comprises the phosphogypsum material. Further, the process includes communicating the washed solid stream to the mixing step where the phosphogypsum and the decontaminating solution are mixed.

A still further object of the present invention is to provide a process for reducing the level of radionuclei in a phosphogypsum material as described above, wherein the process further contemplates the step of, contacting the liquid stream (acid stream originating from the decontaminating solution after mixing with phosphogypsum and separation) having the large portion of the radioactive contaminant with an ion-exchange resin or a suitable filter impregnated with ion specific resin, for bonding the radioactive contaminant thereto to effectuate the removal of the radioactive contaminant to create regenerated decontaminating solution.

Thereafter, the process includes returning the regenerated decontaminating solution to the mixing step where the phosphogypsum material is mixed with the decontaminating solution.

Another object of the present invention is to provide a process for reducing the level of radionuclei of phosphogypsum solids in a phosphogypsum material from wet acid processing of a phosphate containing ore, such that: (1) a non-regulated phosphogypsum is created whereby a large portion of the radioactive contaminant is removed from the process; (2) the liquid constituents of the process are reclaimed and recycled in the process; (3) a portion of the decontaminant is reclaimed and reused; and (4) the decontamination solution is regenerated and recycled.

Another object of the present invention is to provide a process for reducing the level of radionuclei of phosphogypsum solids in a phosphogypsum material from wet acid processing of a phosphate-containing ore, wherein the acid decontamination solution is a nitric acid solution and the radioactive contaminant includes, but is not limited to, radium-226.

It is a still further object of the present invention to provide a process for reducing the level of radionuclei in phosphogypsum solids in a phosphogypsum material which essentially treats the radioactive contaminant(s) of the phosphogypsum material from the production of phosphoric acid from wet acid processing of a phosphate-containing ore. As a result, the large stacks of phosphogypsum material can be prevented and/or eliminated in an environmentally friendly process.

In view of the above objects, it is a feature of the present invention to provide a process for reducing the level of radionuclei in phosphogypsum solids in a phosphogypsum material which is relatively cost effective and eliminates radium-226 or other NORM to limits below the current NESHAP regulations to create non-regulated phosphogypsum for use in construction material or the like.

Another feature of the present invention is to provide a process for reducing the level of radionuclei in phosphogypsum solids in a phosphogypsum material, which is environmentally friendly.

A further feature of the present invention is to provide a process for reducing the level of radionuclei in phosphogypsum solids in a phosphogypsum material, which is time and energy efficient while reducing radium-226 to levels below the government-regulated standard.

A further feature of the present invention is to provide a process for reducing the level of radionuclei in phosphogypsum solids in a phosphogypsum material, which is cost efficient while reducing radium-226 to levels below the government regulation of 10.0 pCi/g.

These and other objects of the present invention have been satisfied by the discovery of a process for reducing a level of radionuclei in a phosphogypsum material having a radioactive contaminant, comprising the steps of:

(a) mixing the phosphogypsum material with an acid decontamination solution to form a mixture;

(b) separating the mixture into a liquid stream having a large portion of the radioactive contaminant and a solid stream having a residual component of the acid decontamination solution; and (c) removing the residual component of the acid decontamination solution from the solid stream.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE PREFERRED EMBODIMENTS

The present invention relates to a process for the removal or reduction of radionuclei in a phosphogypsum material. The process of the present invention contemplates the following steps. The first step includes mixing the phosphogypsum material with a decontaminating solution to form a mixture to effectuate adsorption of a large portion of the radioactive contaminant by the decontaminating solution. Thereafter, the process includes separating the mixture into a liquid stream having the large portion of the radioactive contaminant and a solid stream having a residual component of the decontaminating solution. Further, the process includes neutralizing the solid stream, preferably by washing with fresh water and thereafter neutralizing the water, or alternatively using a neutralizing agent solution adapted to neutralize the residual component of the decontaminating solution contained in the solid stream.

Additionally, what is provided is a process for reducing the level of radionuclei in phosphogypsum solids wherein the solids are contaminated with a radioactive contaminant. The process contemplates the following steps. The first step includes violently agitating the phosphogypsum crystals with a decontaminating solution to maximize surface area contact between the phosphogypsum crystals and the decontaminating solution to effectuate adsorption of a large portion of the radioactive contaminant into the decontaminating solution during a retention time and to create a mixture. Thereafter, the process includes the step of separating the mixture into a liquid stream having the large portion of the radioactive contaminant and a solid stream having a residual component of the decontaminating solution.

In an exemplary embodiment, during wet acid processing of a phosphate containing ore to produce phosphoric acid, a phosphogypsum slurry is created. The slurry includes phosphogypsum solids in a liquid. In an exemplary embodiment, the slurry is an output stream from the wet acid process which produces phosphoric acid, but could be any slurry of phosphogypsum solids that is contaminated by NORM. Thus, the phosphogypsum solids are not from soil or benefacted rock. Instead, the phosphogypsum solids of the present invention are small crystals as are conventionally produced during wet processing of phosphate containing ore in the production of phosphoric acid. The phosphogypsum solids form a generally homogeneous material with respect to particle size, although some size difference can be tolerated in the process. These solids are crystals having radium-226, uranium-238 and the like adhered thereto. Moreover, the solids oftentimes form clusters thereby entrapping radium-226, uranium-238 and the like within the crystalline latticework of the cluster.

Figure 1:
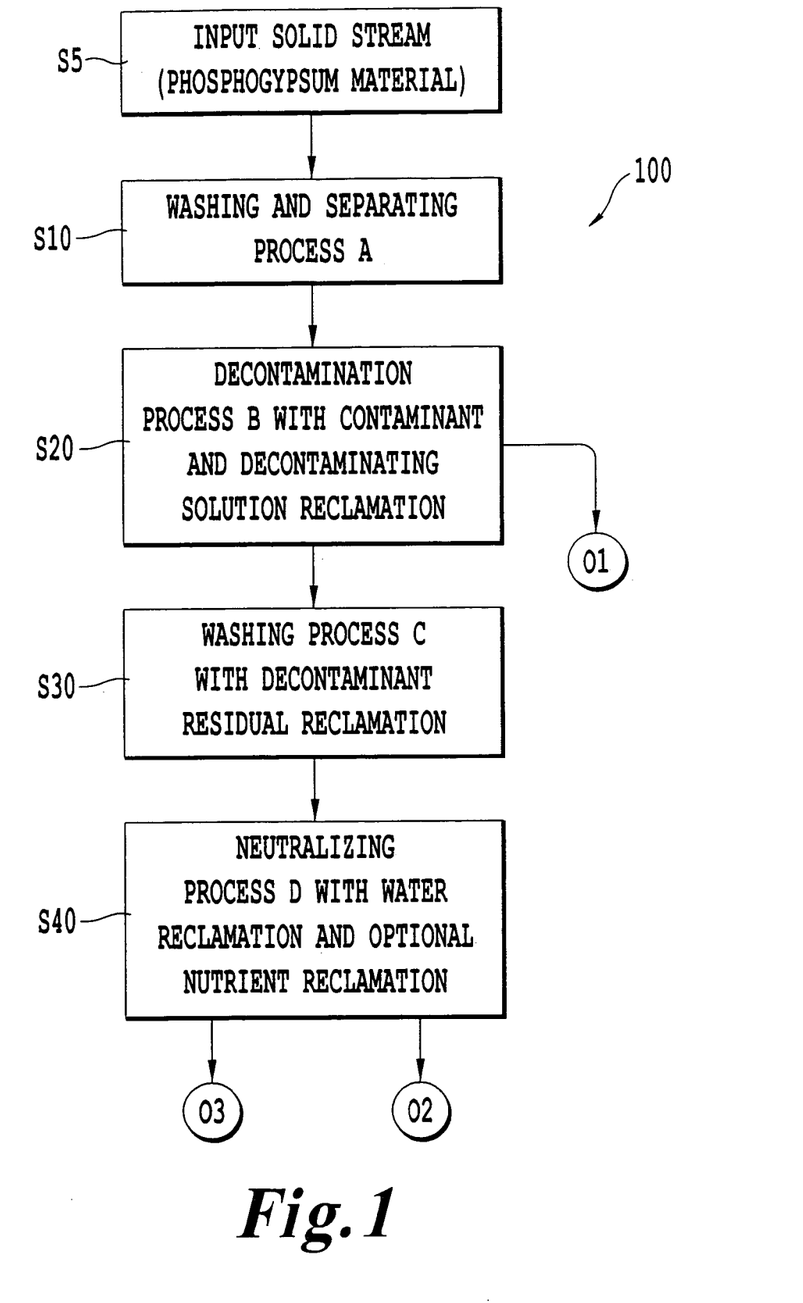
FIG. 1 illustrates a generalized flowchart of the process of the present invention.

Referring now to the drawings, and in particular FIG. 1, the phosphogypsum decontamination process 100 of the present invention begins with Step S5 wherein solids (phosphogypsum material) from the slurry, having contaminated phosphogypsum solids, are passed to Step S10, a washing and separation process A (a prefilter step). The washing and separation process A preferably cleans the phosphogypsum material by flushing the residuals of the mother liquor away from the phosphogypsum solids. The water used in the working phase can be fresh water or process water, depending on the water balance requirements of the particular plant or location. If no water balance issue is present, fresh water can be used, with recovery of the spent water along with residual phosphoric acid into the same or a different process in the plant, or into a product such as diammonium phosphate (DAP). If water balance is an issue however, the water used can be process water, preferably in the prefilter step, with the filtrate returned to the process in order to improve $P_2O_5$ recovery. The washing and separation process A passes the washed contaminated phosphogypsum solids to a decontamination process B at Step S20.

In an exemplary embodiment, the washing phase of washing and separation process A attempts to remove a portion of those contaminants which coat the phosphogypsum solids such as, without limitation, fluoride and phosphoric acid which are very water soluble. In other words, the coating of the water soluble contaminants and other suspended contaminants are easily removed with the application of water or another suitable liquid in a flushing manner which allows such contaminants to be carried away in the liquid stream.

In the washing phase, the feed phosphogypsum typically has very high levels of phosphate, due to the limitations of filter performance. It is not unusual for hemihydrate gypsum to contain 7% $P_2O_5$, whereas dihydrate gypsum is much lower around 2% $P_2O_5$. While most processes use dihydrate as the starting material, in hemihydrate based processes, it is desirable to install transformation tanks to convert the hemihydrate gypsum to dihydrate, which has the effect of releasing the $P_2O_5$ from the hemihydrate crystal and into the slurry. The present process can therefore use this initial wash/separation (pre-filter) step as a dihydrate filter to capture the excess $P_2O_5$ in the event that the plant is based on hemihydrate use.

The prefilter, or washing/separation step, may not be necessary if the phosphogypsum used in the process has been stored in stacks for a time period sufficient to permit leaching of the impurities (F and phosphoric acid, for example) from the solids, or if adequate filtration is available in the process.

Alternatively, it may be desirable to skip the prefiltering process in order to retain the $P_2O_5$ in the phosphogypsum. The resulting product after removal of radionuclei, could be beneficial as a nutrient upon neutralizing it along with neutralizing of the acid used in later steps (preferably nitric acid). Alternatively, in the absence of the prefiltering process, the $P_2O_5$ can be left in to be entrained in the acid decontamination solution, particularly in the case of using nitric acid, for use in production of N-P fertilizers.

The decontamination process B of Step S20 removes a radioactive contaminant from the solids using a decontamination solution in an environment, which maximizes surface area contact of the decontamination solution with the contaminant(s). The environment which maximizes surface area contact is accomplished by violent agitation. The violent agitation is preferably at a level which is non-destructive to the phosphogypsum solids but breaks down the clusters of crystals so that the entrapped radium-226 can be exposed to the decontamination solution. More preferably, the violent agitation is limited to a near-shearing level, wherein shearing or destruction of the phosphogypsum solids does not take place.

It should be further noted that the phosphogypsum solids tend to settle. This can be converted using a ratio of liquid/solids, that minimizes settling or formation of crystal clusters. Preferably, this ratio is from 20/80 to 80/20 liquid/solids. More preferably, violent agitation in a 70/30 liquid/solids ratio attempts to minimize the settlement of the solids or the clusters of solids. Thus, a more homogeneous distribution of the solids in the decontamination solution is created which maximizes surface area contact. The decontaminating process B is preferably carried out for a retention time within the range of 30 to 120 minutes, more preferably 30 to 90 minutes, so that the solids are exposed to the decontamination solution to sufficiently solubilize the radioactive contaminant to an extent that it can be carried away in the decontaminating solution.

The decontaminating process B removes a large portion of the radioactive contaminant from the phosphogypsum solids and subsequently from the process 100 at output 01. Additionally, the decontamination process B reclaims the decontaminating solution or a portion thereof for reuse in the decontamination process B.

As can be appreciated, the reclamation of the decontamination solution minimizes the overall cost of the process 100 so that replenishment of the decontamination solution is gradual and so that the concentration of the decontamination solution is maintained. This also reduces the level of nitrate left in the gypsum which minimizes the necessary wash water to neutralize the cake. In a preferred embodiment, a decontamination solution should be in the pH range of 0 to 4, more preferably 0 to 2, most preferably ½ to 1. However, a pH of 2 may also create the desirable result. Moreover, the decontamination solution may be a concentrated acid solution, preferably having a concentration range of 10% to 65% of the decontaminant. The decontamination solution can be any acid sufficient to effect removal of the radionuclei, including, but not limited to, nitric acid, carbonic acid, hydrochloric acid, hydrobromic acid and hydrofluoric acid. A nitric acid solution is preferred. After the retention time has elapsed, Step S20 is followed by Step S30 wherein decontaminated solids from process B are passed to another washing process C. During the washing process C, a portion of the residual of the decontaminant of the decontaminating solution, which had been retained by the decontaminated solids, is reclaimed. The reclaimed decontaminant is preferably reused after reconcentration, by adding to the decontaminating solution in the decontamination process B or, in the preferred case of nitric acid, can be used to produce a nutrient rich N-K or N-P-K byproduct by neutralizing the now weak acid solution with potassium hydroxide thus forming potassium nitrate. By controlling the level of nitrate present in the cake and varying the volume of wash water, the rate of potassium nitrate produced could be controllable by demand.

Step S30 is followed by Step S40 wherein the remaining portion of the residual decontaminant of the decontaminating solution is neutralized with a neutralizing agent in a process D. In the preferred embodiment, a neutralization agent is selected so that a sellable byproduct or a soil nutrient is created at output 03. Moreover, process D recycles the fresh water used in the washing or mixing phase. Additionally, the solid stream on output 02 contains neutralized and non-regulated gypsum.

As can be readily seen, the process 100 of the present invention processes phosphogypsum material such that: (1) a sellable gypsum capable of use in construction materials or other products is created (as the gypsum contains radioactive contaminants below the government regulation); (2) radioactive contaminant is removed from the process; (3) the liquid constituent of the process is reclaimed and recycled in the process as desired; and (4) a portion of the decontaminant is reclaimed and reused. Thus, the process 100 essentially treats the phosphogypsum material created during wet-acid processing of a phosphate containing ore in a fashion that lowers the radioactive contaminant to below the government regulation. As a result, the process can prevent the formation of the large phosphogypsum stacks, or can even eliminate currently existing or abandoned stacks in an environmentally friendly manner.

Figure 3:
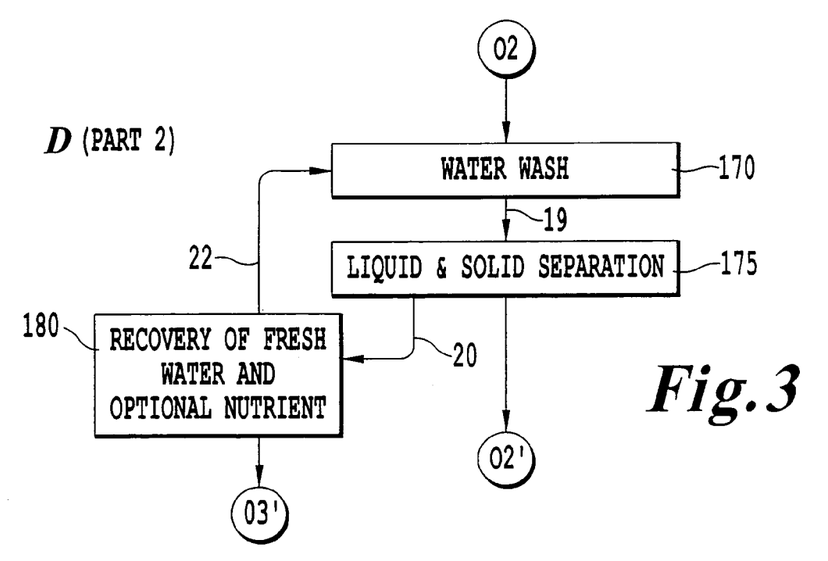
FIG. 3 illustrates a continuation of the neutralization closed loop process of FIG. 2.

In an alternate embodiment, multiple steps of Steps S30 precede Step S40 so as to minimize the amount of neutralizing agent required. Furthermore, Step S40 includes a washing phase with a caustic compound or neutralizing agent with liquid and solid separation. Thereafter, a fresh water wash is followed in a sub-closed loop as best seen in FIG. 3.

In a most preferred embodiment, each process B-D preferably receives a solid stream which is subsequently added to a liquid constituent in a 70/30 liquid/solids ratio. A range of 30/70 to 70/30 liquid/solids ratio for each washing phase is adequate.

Figure 4:
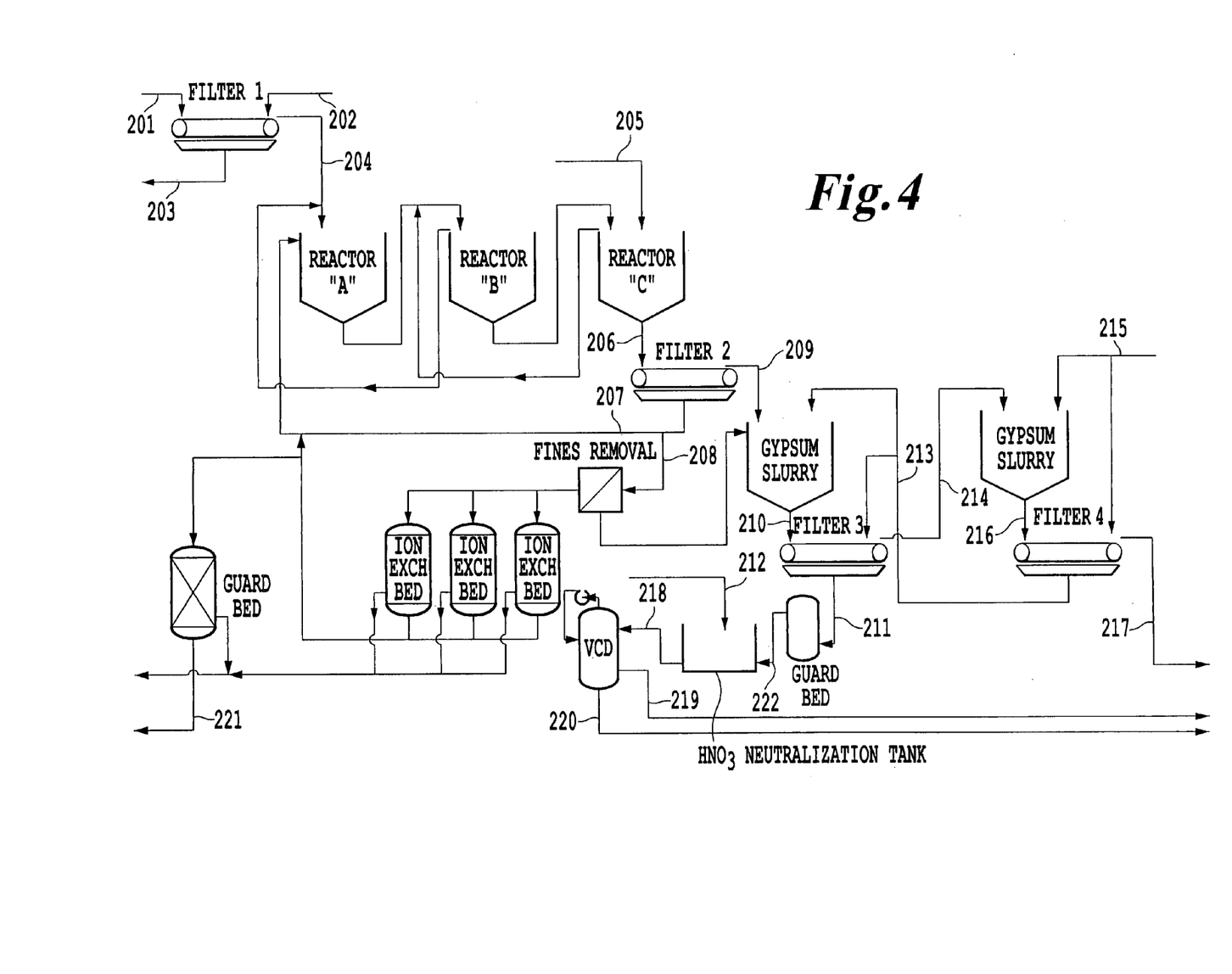
FIG. 4 illustrates a detailed flowchart of a preferred embodiment of the present invention process, including the multi-step acid wash and multi-step reslurrying and acid removal steps.

FIG. 4 provides a flow diagram for a preferred embodiment of the present process. In this diagram, the phosphogypsum starting material (containing the radionuclei contaminant) 201 is added to the surface of Filter 1, followed by washing with wash water 202 (preferably from process water). The dihydrate filtrate 203 is then removed and sent for further processing such as in a hemihydrate filter (not shown). The washed phosphogypsum material (still containing radionuclei) 204 is added to Reactor A along with decontaminant solution (preferably nitric acid). The decontaminant solution can be virgin nitric acid, recycled nitric acid from Filter 2, back-added nitric acid from Reactors B and C, or any combination of the above. While the Figure shows 3 reactors in which the nitric acid is mixed with the phosphogypsum, this is merely a preferred embodiment. This step of the process can be performed in a single reactor or in a plurality of reactors. Once the slurry reaches the final reactor (in this figure, Reactor C), the slurry is ready for separation. At any of the Reactors along the way, makeup nitric acid 205 can be added as needed to maintain the solids/liquid ratio. The slurry is then placed onto Filter 2 through line 206. The filtrate is "pregnant" nitric acid (containing the radionuclei contaminant) 207. This is routed back to one or more of Reactors A–C. Additionally, a portion of the pregnant nitric acid 207 is removed from the recycle line for fines removal and for removal of the radionuclei (line 208). Fines removal (small particles of phosphogypsum) can be performed in any conventional manner, such as porous membranes or filter materials. The fines can then be returned to the process in the Gypsum Slurry tanks. Removal of the radionuclei is preferably performed using one or more ion exchange beds. Preferably a plurality of ion exchange beds is used such that upon saturation of one exchange bed with radionuclei, the saturated bed can be removed or replaced without interrupting the process. As noted above, the exchange beds can be regenerated to recover the radionuclei using conventional chemistry. Alternatively, the exchange beds can be disposed of (under proper regulatory care). The nitric acid solution exiting the exchange beds can be recycled to the process as desired.

Returning to Filter 2, the resultant phosphogypsum product (now without any significant amount of radionuclei present) is added to a Gypsum Slurry tank (along with any Fines as noted above, if desired) along with wash water. The wash water can be fresh water or from later wash steps (line 213) or a combination of these. The Gypsum Slurry wash step can be a single wash, or as shown in the case of FIG. 4, a plurality of wash steps. The intent of these washes is to remove residual nitric acid or nitrates (or other acid decontaminant solution) from the phosphogypsum. Each step preferably comprises a slurrying of the phosphogypsum with water, followed by separation of the solids from the wash water. The separation step (as well as any or all of the previous separation steps) can be formed in a variety of ways, including but not limited to centrifuge, filter, and clarification/sludge thickening. Preferably, as shown in FIG. 4, the separations are performed using a filtering apparatus, more preferably a continuous filter (although a batchwise process can also be performed using conventional batch filters).

The entire process as shown in FIG. 4 is preferably a continuous process, with the filters being continuous filters, such as belt type filtering devices. However, if desired, the process can be performed batchwise using any type of batch filtering devices, or even using the same continuous type filters.

Once the washing/separating steps are completed, the resulting phosphogypsum product is sufficiently free of nitric acid for use in construction grade gypsum products, preferably less than 100 ppm of nitric acid and meets government regulations for level of radionuclei as discussed above.

In an additional embodiment, the wash water can be mildly basic (such as a solution of potassium carbonate or potassium hydroxide, for example) providing more effective removal of nitric acid and consequent neutralization of the residual nitric acid, preferably forming potassium nitrate that can be recovered and used as a plant nutrient, if desired. Alternatively, as shown in FIG. 4, the mildly acidic wash water from the Gypsum Slurry tanks can be subsequently neutralized using similar basic solutions. In an alternative embodiment an additional Guard bed can be used between the filtrate lines 211 and the neutralization step, in order to remove any residual radionuclei present in the filtrate.

EXAMPLE

Figure 2:
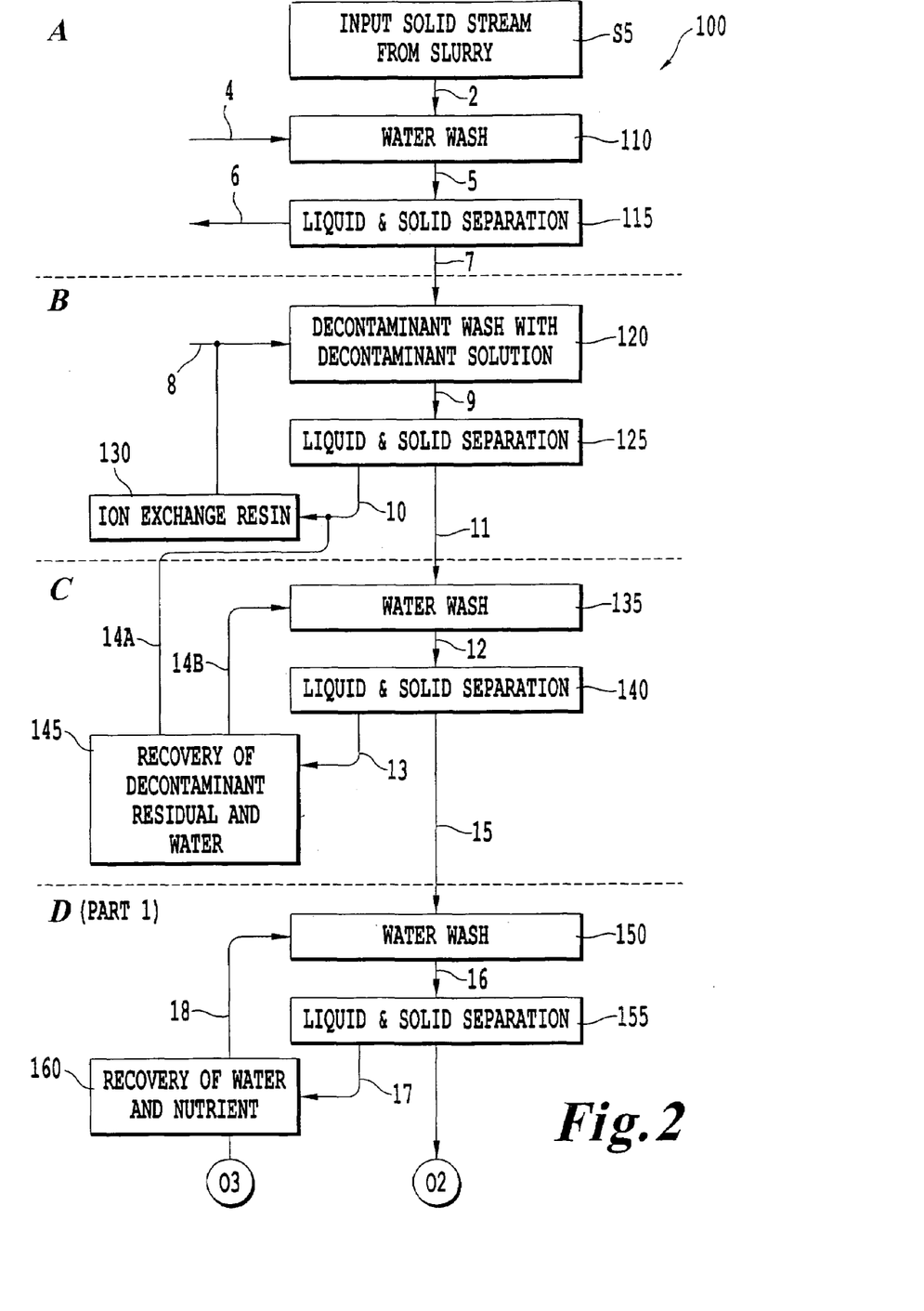
FIG. 2 illustrates a detailed flowchart of the embodiment of FIG. 1.

Referring now to FIG. 2, the gypsum decontamination process 100 begins with Step S5. In general, the incoming slurry is approximately 70% liquid and 30% phosphogypsum solids. The slurry is separated into a solid stream 2 (referred to as the phosphogypsum material) and a liquid stream (not shown) using well known liquid/solids separation techniques. In the exemplary embodiment, the liquid stream (not shown) may be reused by the plant which originally produced the slurry. The process 100 of the present invention hereinafter essentially processes the solid stream 2 of the slurry from Step S5 having the government-regulated contaminated phosphogypsum solids. The phosphogypsum solids are contaminated with radium-226 or NORM.

As a result of the above process, an example of the yields is set forth in Table I.

| Material | Weight |
| --- | --- |
| Phosphogypsum slurry 70/30 liquid/solids ratio | 600 tpd |
| SOLIDS: | 2000 tpd |
| Radium (Ra226) | 14.26 pCi/g |
| Uranium (U238) | 11 pCi/g |
| Fluoride (F) | 7420 mg/kg |
| Phosphate ($PO_4$) | 2190 mg/kg |
| Sulfate ($SO_4$) | 22000 mg/kg |

(Note: tpd means tons per day)

Step S5 is followed by Step 110 where the solid stream 2 (phosphogypsum material) is processed through a first washing phase. In the exemplary embodiment, the contaminated solids are repulped or washed at least once with fresh water from line 4. During the washing phase of Step 110, the mixture of fresh water and contaminated solids has approximately a 70/30 liquid/solids ratio.

Preferably, the washing phase includes violent agitating or violent mixing of the mixture of contaminated solids and fresh water so as to effectuate a washing action. While a 70/30 liquid/solids ratio is preferred, a range of 30/70 to 70/30 liquid/solids ratio is adequate for the washing action and the removal of the water-soluble contaminants. The violent agitating or violent mixing creates an environment where settlement and lumping of phosphogypsum solids is minimized and the surface area contact of the phosphogypsum solids with the fresh water is maximized.

Step 110 is followed by Step 115 where the mixture on line 5 is separated into a liquid stream 6 and a solid stream 7. The liquid stream 6 is communicated outside of the process 100. Steps 110 and 115 constitute the washing and separation process A. The solid stream 7 contains essentially contaminated phosphogypsum solids.

As a result of the washing and separation process A, an example of the yields is set forth in Table II.

TABLE II

| MATERIALS | WEIGHT |
|---|---|
| SOLIDS: | 2000 tpd |
| F | 1090 ppm |
| Silica (Si) | <10 ppm |
| Ra226 | 14 pCi/g |
| U238 | 11 pCi/g |
| $SO_4$ | 16,200 mg/kg |
| $PO_4$ | 521 mg/kg |
| LIQUIDS: | 970 gpm |
| F | 5610 ppm |
| Phosphate ($PO_4$) | 1440 ppm |
| $SO_4$ | 4430 ppm |
| Ra226 | 207 pCi/L |
| Uranium (U238) | 554 pCi/L |

The solid stream 7 from Step 115 is inputted into the decontamination process B to remove a large portion of the radioactive contaminant(s) from the phosphogypsum solids, such as radium-226 or NORM. Step 115 is followed by Step 120 where the solid stream 7 is mixed with the decontaminating solution (which in the present example is a concentrated nitric acid ($HNO_3$) solution) on line 8 at ambient or room temperature for a retention time of 15 to 60 minutes. In the preferred embodiment, the retention time is for substantially 30 minutes, although lower times can be used.

Various acids were used to render the radium-226 soluble. Nitric acid solution was the best decontaminant to solubilize the radium-226 for the crystal of the phosphogypsum solid. Moreover, the decontaminating solution should more preferably have a pH of ½ to 1 with 1 being most preferred.

Step 120 is then followed by Step 125, where the mixture on line 9 is separated from the nitric acid ($HNO_3$) solution into a liquid stream 10 and a solid stream 11. The washing at Step 120 may be performed one or more times. In the exemplary embodiment, the solid stream 11 is subsequently processed by process C.

As a result of process B, an example of the yields is set forth in Table III.

TABLE III

| MATERIAL | WEIGHT |
|---|---|
| SOLIDS: | |
| F | 530 ppm |
| Nitrate | 44600 ppm |
| Si | 51 ppm |
| Ra226 | 3 pCi/g |
| U238 | 9 pCi/g |
| LIQUIDS: | |
| $PO_4$ | 76 ppm |
| Ra226 | 4353 pCi/L |
| U238 | 86 pCi/L |

In a preferred embodiment, the phosphogypsum solids of solid stream 7 are mixed and reacted with a 65% concentrated nitric acid ($HNO_3$) solution in a 70/30 liquid/solids ratio. This mixture is violently agitated during the washing at Step 120 at ambient or room temperature which effectuates decontamination in that a significant portion of the radium-226 or NORM is adsorbed or impregnated in the nitric acid ($HNO_3$) solution. While, a concentration of nitric acid of 65% to concentrated is preferred, other concentrations can be substituted. However, lower concentrations may require longer retention times to remove radium-226 to levels at or below the government regulation of <10 pCi/g.

At Step 120 no heat is added. Therefore, the washing is carried out at ambient or room temperature. In a refinery, the ambient temperature may be the result of climate control methods like air conditioning. Otherwise, the ambient temperature may be the result of the temperature of the local weather.

The liquid stream 10 containing the nitric acid solution impregnated with the radium-226 is contacted with an ion-exchange resin at Step 130. The ion exchange, such as Dowex RSC manufactured by DOW Chemical or Eichrome, removes the radium-226 from the liquid stream 10 thereby regenerating the nitric acid solution. Thus, the nitric acid solution is essentially radium-free and can be returned to Step 120 on line 8. As can be appreciated, the regenerated nitric acid solution is reclaimed for repeated use during the washing phase of Step 120.

Process B does not require continual looping of the impregnated nitric acid solution to the ion-exchange resin until the concentration of the nitric acid is diminished or the level of the impregnating radioactive contaminant is sufficiently high to compromise the effectiveness of the nitric acid solution. In other words, after the retention time has elapsed, the separated impregnated nitric acid solution does not have to be contacted with the ion-exchange resin.

During the radium removal phase of process B, the ion-exchange resin becomes filled with radium-226. Once the ion-exchange resin is essentially filled to capacity, the radium saturated ion-exchange resin can be replaced with another and the filled ion-exchange resin can be properly disposed of, sold or regenerated. Therefore, the radioactive contaminant radium-226 is removed from process B at output 01.

Approximately four to six grams of pure radium-226 are generated from every one million tons of phosphogypsum solids treated using the process 100 of the present invention. The regenerated ion-exchange resin is again ready to be used in process B. Some resins, however, are non-regenerative and may either be sold as radium-loaded resin or disposed of as a contaminated resin.

The decontaminated solids on line 11 are sent to Step 135 and are repulped or washed with fresh water in a 70/30 ratio of liquid/solids using mixing or washing for a retention time of approximately 5 minutes. The washing retention time may be increased or, if necessary, the washing phase may be repeated. The mixture of Step 135 is passed on line 12 to Step 140 where a liquid/solid separation is performed. At Step 145 the liquid stream 13 is processed in a water recovery step to capture a portion of any residual nitric acid ($HNO_3$) and separate and reclaim the liquid (water) of the liquid stream 13. The nitric acid ($HNO_3$) is injected on line 14a into the liquid stream 10. Thus, the nitric acid ($HNO_3$) is recycled and reused. The water stream 14b from Step 145 is recycled and reused in process C at Step 135.

As a result of process C, an example of the yields are set forth in Table IV.

TABLE IV

| MATERIAL | WEIGHT |
|---|---|
| SOLID: | |
| F | 740 ppm |
| Nitrate | 4520 ppm |
| Si | 176 ppm |
| Ra226 | 3 pCi/g |
| U238 | 9 pCi/g |
| LIQUID: | |
| F | 395 ppm |
| Nitrate | 21900 ppm |
| $PO_4$ | 2 ppm |
| $SO_4$ | 22300 ppm |
| Ra226 | 1529 pCi/L |
| U238 | 0.06 pCi/L |

The solid stream 15 from process C is passed to water wash Step 150 of process D and is washed a second time using the same liquid/solids ratio. However, in one embodiment, prior to the liquid/solids separation at Step 155, a neutralizing agent such as a caustic compound (for example, sodium carbonate ($NACO_3$)) is added during the washing phase at Step 150 to adjust the pH of the solid stream 15 to a pH between 6.5 and 8.0. The neutralizing agent reacts with the residual decontaminant (nitric acid $HNO_3$) in the water wash which is passed on line 16 to Step 155. The mixture of the solid stream 15 and the neutralizing agent is then separated into a liquid stream 17 and a solid stream on output line 02. The solid stream has a radium-226 content which is below the current regulatory limits (<5.0 pCi/g) for construction material. In addition, the radium-226 content is below the current regulatory limit of (10 pCi/g) for agricultural application.

In an alternative preferred embodiment, the solids from process C are slurried with water, then the solids separated, preferably by filtering to produce a solids cake containing residual $HNO_3$ in the solids. Accordingly the number of reslurry/separation iterations is dependent on the level of $HNO_3$ that can be tolerated in the final gypsum product. Further, any residual acid can also be neutralized in any of the reslurry/separation stages by using a basic solution. Any basic solution can be used, such as alkali hydroxides, but potassium hydroxide is most preferred as it would result in production of potassium nitrate, a useful byproduct, since it is a plant nutrient.

The liquid stream 17 is passed to Step 160 where the liquid portion of the stream is recovered. The liquid portion is recycled on line 18 back to the washing phase of Step 150 in process D.

Referring now to FIG. 3, the neutralization process D further includes a fresh water wash at Step 170 wherein the solid stream on output line 02 is again washed. The mixture from the washing Step 170 is passed to Step 175 where liquid/solid separation takes place. The liquid stream on line 20 is recovered at Step 180 wherein with an optional soil nutrient, such as potassium nitrate on line 03' is generated. Furthermore the solid stream 02' is further neutralized gypsum with a pH of 7 ppm. The recovered water from 180 is sent on line 22 back to Step 170.

During the neutralizing process D, the residual decontaminant is neutralized with a basic compound, such as sodium carbonate, potassium hydroxide or the like. Thus, the recovery phase yields potassium nitrate (when a potassium-salt is used) on output line 03 which is capable of being used as a soil nutrient.

In another embodiment, in lieu of adding the basic compound as part of the water wash of Step 150, the neutralized solid stream 02 is further washed with the caustic compound in a process to reclaim the water and produce decontaminated and neutralized gypsum having approximately 7 ppm of nitrate.

As a result of the neutralizing process D, an example of the yields is set forth in Table V.

TABLE V

| MATERIAL | WEIGHT |
|---|---|
| SOLIDS: | |
| Nitrate | 7 ppm |
| $CO_3$ | 10 ppm |
| LIQUIDS: | |
| $NO_3$ | output O3 |

As can be seen, the nitrate absorbed in the solid stream 15 has been reduced from 4,520 ppm to 7 ppm. Thus, a significant portion of the nitrate has been reclaimed. In an alternative embodiment, as noted above, additional washing at Step 150 may be substituted for the addition of the basic compound or neutralizing agent.

As a result of the above process 100, the products created are (1) non-regulated gypsum solid material on output line 02 and 02'; (2) neutralizing agent or byproduct thereof on output line 03 and 03'; and (3) radium-226 on output line 01.

The process 100 of the present invention may be accomplished at the output side of phosphoric acid production by directly receiving a phosphogypsum slurry having the phosphogypsum material. On the other hand, the process 100 may create a slurry by using the dried contaminated phosphogypsum material piled in the aforementioned stacks.

In summary, the process 100 is carried-out without the need for heating the water or decontaminating solution or by applying a heating component to the process A, B, C or D. It should be noted that essentially rapid results are created without the need for the expense of energy for heating. The ambient temperature for the process 100 is in the range of 70 to 100 degrees Fahrenheit.

WORKING EXAMPLES

Day 1

A: Filter Raw Gyp Slurry:

Weight of solids: 39.15 lbs. (32.8% by wt.); Sample labeled S-1.

Radium 226 is 14 pCi/g and Uranium is 11 pCi/g.

Weight of liquid: 80.25 lbs., sp. gr.=1.0583 gm/cc or 9.1 gallons (67.2% by wt.) with pH=1.27; Sample labeled L-1. Radium 226 is 461 pCi/L and Uranium is 60 pCi/L.

B: Repulp of Solids S-1:

4540 gms. (10 lbs.) Filtered solids from above washed with 10,600 cc (2.8 gal.) tap water agitated @ 1,000 rpm for one minute using a shear-type mixing blade, then filtered. 7.85 lbs. Solids recovered, sample labeled S-2. Radium 226 is 14 pCi/g and Uranium is 12 pCi/g.

25.55 lbs. (11,750 cc) wash water recovered, sample labeled L-2, pH=1.98. Radium 226 is 207 pCi/L and Uranium is 554 pCi/L.

C: Acid Wash of Solids:

1800 gms. S-2 solids (3.96 lbs.) Plus 4,200 cc. concentrated Nitric Acid were mixed @ 92 F @ 500 rpm using a non-shear type mixing blade. One-half of the mix was removed after 30 minutes time and filtered. The other half was mixed for one hour total time followed by filtration. Each solids portion was repulped for one minute mixing time @ 500 rpm using 1,600 cc. fresh tap water.

30 min. Sample:

1129 gms. solids labeled S-3 were filtered. Radium 226 is 3 pCi/g and Uranium is 9 pCi/g.

2350 cc. Pregnant Nitric Acid solution labeled L-3 (dark brown color).

1700 cc. Repulp wash water labeled L-4 (yellow color). Radium 226 is 1529 pCi/L and Uranium is 0.06 pCi/L.

One Hour Sample:

635 gms. solids labeled S-4 were filtered. Radium 226 is <1.58 pCi/g and Uranium is 12 pCi/g.

1500 cc. Pregnant Nitric Acid solution labeled L-5 (dark brown color). Radium 226 is 4353 pCi/L and Uranium is 86 pCi/L.

1680 cc. repulp wash water labeled L-6 (pale yellow color). Radium 226 is 1447 pCi/L and Uranium is 36 pCi/L.

Day 2

The Dowex 21 K resin was sulfonated to a pH of 2.7 using 1N Sulfuric Acid solution.

The Dowex RSC and Eichrom IX resins were water soaked using deionized water.

Day 3

A: Nitric Acid Ion-Exchange:

900 cc. of sample L-4 (water from S-3 repulp) were mixed for 6 minutes with 450 cc. of Eichrom IX resin and then filtered. Filtered (lean) Nitric Acid sample labeled L-7.

The same 450 cc. of Eichrom IX resin was then mixed with 1,120 cc. of sample L-6 (water from S-4 repulp) and mixed for 7.5 minutes. The filtrate was labeled L-8.

Radium 226 is 916 pCi/L and Uranium is 9 pCi/L.

350 cc. of fresh Eichrom IX were mixed with 1350 cc. sample L-3 (33 min. pregnant Nitric Acid) and mixed for 9 minutes. The filtrate was labeled L-9.

300 cc. of fresh Eichrom IX were mixed with 690 cc. sample L-5 (one hour pregnant Nitric Acid) for 4.6 minutes. The filtrate was labeled L-10. Radium 226 is 2058 pCi/L and Uranium is 9 pCi/L.

Note: All resin mix times were based on the equivalent of 2.5 gallons per minute per square foot of resin.

It is noted that the embodiment of the process described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A process for reducing a level of radionuclei in a phosphogypsum material having a radioactive contaminant, comprising the steps of:
   (a) mixing the phosphogypsum material with an acid decontamination solution to form a mixture;
   (b) separating the mixture into a liquid stream having a large portion of the radioactive contaminant and a solid stream having a residual component of the acid decontamination solution; and
   (c) removing the residual component of the acid decontamination solution from the solid stream, comprising slurrying the solid stream with a wash solution, followed by separation of solids from liquid, wherein the wash solution comprises water and a neutralizing agent.

2. The process of claim 1, wherein the mixture comprises a 70/30 liquid/solids ratio.

3. The process of claim 1, wherein the mixture comprises a liquid/solids ratio in the range of 80/20 to 20/80.

4. The process of claim 1, wherein the mixing step(a) comprises:
   (ai) violently agitating the mixture for a duration.

5. The process of claim 4, wherein:
   the duration is from 30 to 90 minutes.

6. The process of claim 4, wherein the duration is 60 minutes.

7. The process of claim 1, wherein the mixing step (a) comprises:
   (ai) violently agitating the mixture at an ambient temperature in the range of 70 degrees Fahrenheit to 100 degrees Fahrenheit for a duration.

8. The process of claim 1, wherein the neutralizing agent comprises a basic compound.

9. The process of claim 8, wherein the basic compound is a member selected from the group consisting of alkali hydroxides, alkaline earth metal hydroxides, alkali carbonates and alkaline earth metal carbonates.

10. The process of claim 1, wherein the solid stream comprises gypsum having a radium-226 content less than 10.0 pCi/g.

11. The process of claim 10, wherein the solid stream comprises gypsum having a radium-226 content less than 5.0 pCi/g.

12. The process of claim 1, further comprising:
    (d) contacting the liquid stream having the large portion of the radioactive contaminant from step (b) with an ion-exchange resin to remove the radioactive contaminant from the liquid stream and provide a regenerated acid decontamination solution.

13. The process of claim 12, further comprising (e) returning the regenerated acid decontamination solution to step (a).

14. The process of claim 1, wherein the acid decontamination solution is a nitric acid solution.

15. The process of claim 14, wherein the nitric acid solution is a concentrated nitric acid solution.

16. The process of claim 15, wherein the concentrated nitric acid solution has a pH in the range of 0.5 to 2.0.

17. The process of claim 16, wherein the concentrated nitric acid solution has a pH in the range of 0.5 to 1.0.

18. The process of claim 14, wherein the nitric acid solution is an aqueous nitric acid solution.

19. The process of claim 18, wherein the aqueous nitric acid solution has a concentration of from 50–65% nitric acid.

20. The process of claim 1, wherein said mixing step (a) is performed in a plurality of reactors in sequence.

21. The process of claim 1, wherein said removing step (c) is performed in a plurality of slurry tanks in sequence, such that starting with a second slurry tank, each slurry tank is separated from a preceding slurry tank by a means for separating solids from liquid.

22. The process of claim 21, wherein at least a portion of the liquid resulting from the means for separating solids from liquid is recycled to a prior slurry tank or used as wash water for the means for separating solids from liquid or both.

23. The process of claim 1, wherein said liquid stream having a large portion of the radioactive contaminant is subjected to fines removal to generate a fines stream and a fine-free liquid stream having a large portion of the radioactive contaminant.

24. The process of claim 23, wherein the fines stream is combined with the solids stream in step (c).

25. The process of claim 23, wherein the fine-free liquid stream having a large portion of the radioactive contaminant is contacted with an ion-exchange resin to remove the radioactive contaminant from the fine-free liquid stream to provide a regenerated acid decontamination solution.

26. A process for reducing a level of radionuclei in a phosphogypsum material having a radioactive contaminant, comprising the steps of:
   (a) mixing the phosphogypsum material with an acid decontamination solution to form a mixture;
   (b) separating the mixture into a liquid stream having a large portion of the radioactive contaminant and a solid stream having a residual component of the acid decontamination solution; and
   (c) removing the residual component of the acid decontamination solution from the solid stream, wherein the step (c) comprises the steps of
   (ci) mixing the solid stream with water to create an aqueous slurry of solids;
   (cii) separating the aqueous slurry of solids into a liquid stream and a washed solid stream;
   (ciii) neutralizing at least a portion of the liquid stream with a neutralizing agent to create a neutralized liquid stream; and
   (civ) recovering the washed solid stream.

27. The process of claim 26, wherein the aqueous slurry of solids comprises a 70/30 liquid/solids ratio.

28. The process of claim 26, wherein the aqueous slurry of solids comprises a liquid/solids ratio in the range of 80/20 to 20/80.

29. The process of claim 26, wherein the washed solid stream comprises neutralized gypsum having a radium-226 content less than 10.0 pCi/g.

30. The process of claim 29, wherein the washed solid stream comprises neutralized gypsum having a radium-226 content less than 5.0 pCi/g.

* * * * *